(12) United States Patent  
Zielinsky

(10) Patent No.: US 8,109,553 B2  
(45) Date of Patent: Feb. 7, 2012

(54) MULTI-POSITION TAILGATE RETAINING AND COUNTERBALANCING APPARATUS AND METHOD

(76) Inventor: Cary R. Zielinsky, Liberty, UT (US)

( * ) Notice: Subject to any disclaimer, the term of this patent is extended or adjusted under 35 U.S.C. 154(b) by 184 days.

(21) Appl. No.: 12/555,965

(22) Filed: Sep. 9, 2009

(65) Prior Publication Data

US 2011/0057469 A1    Mar. 10, 2011

(51) Int. Cl.
  *B62D 33/03*    (2006.01)
(52) U.S. Cl. .................... 296/57.1; 296/106
(58) Field of Classification Search ............ 296/50, 296/57.1, 146.8, 59, 106; 16/82
  See application file for complete search history.

(56) References Cited

U.S. PATENT DOCUMENTS

| | | | | |
|---|---|---|---|---|
| 5,449,212 | A * | 9/1995 | Seifert | 296/57.1 |
| 6,068,321 | A * | 5/2000 | Ooms | 296/57.1 |
| 6,196,608 | B1 * | 3/2001 | Ooms | 296/57.1 |
| 6,196,609 | B1 * | 3/2001 | Bowers | 296/57.1 |
| 6,357,813 | B1 * | 3/2002 | Vandeberghe et al. | 296/57.1 |
| 6,793,264 | B1 * | 9/2004 | Muller et al. | 296/57.1 |
| 6,994,390 | B2 * | 2/2006 | Zagoroff | 296/57.1 |
| 7,029,050 | B1 * | 4/2006 | Johnson et al. | 296/57.1 |
| 7,281,748 | B2 * | 10/2007 | Ruhlander et al. | 296/57.1 |
| 7,287,803 | B2 * | 10/2007 | Koneval et al. | 296/146.4 |
| 7,309,094 | B2 * | 12/2007 | Norfleet | 296/57.1 |
| 7,314,241 | B2 * | 1/2008 | Roach | 296/57.1 |
| 7,357,435 | B2 * | 4/2008 | Robertson | 296/57.1 |
| 7,401,832 | B2 * | 7/2008 | Yui et al. | 296/57.1 |
| 7,419,204 | B2 * | 9/2008 | Coble et al. | 296/57.1 |
| 7,422,262 | B2 * | 9/2008 | Marshall | 296/57.1 |
| 7,637,552 | B2 * | 12/2009 | Ruhlander et al. | 296/57.1 |
| 7,677,628 | B2 * | 3/2010 | Lowentat et al. | 296/57.1 |
| 2006/0093307 | A1 * | 5/2006 | Lowentat et al. | 385/147 |
| 2008/0150311 | A1 * | 6/2008 | Quigley et al. | 296/57.1 |

* cited by examiner

*Primary Examiner* — Glenn Dayoan  
*Assistant Examiner* — Gregory Blankenship  
(74) *Attorney, Agent, or Firm* — Warren M. Pate, LLC

(57) ABSTRACT

A multi-position tailgate retaining and counterbalancing apparatus and method is disclosed. The apparatus maintains the look and functionality of a conventional tailgate for a pickup truck. The apparatus and methods may include a counterbalance reducing the effort required to lift or lower the tailgate. The apparatus and methods may allow the counterbalanced tailgate to be lowered to, and automatically stop at the standard open position like a conventional tailgate. Moreover, by pulling and releasing the tailgate release latch handle, the tailgate may be lowered further to a fully open position. Upon reaching this lower, fully open position, the tailgate may automatically stop. The apparatus and methods may also provide a counterbalanced tailgate that secures at multiple predetermined positions between the closed and fully open positions, each such position retaining the tailgate's full load carrying capacity.

20 Claims, 16 Drawing Sheets

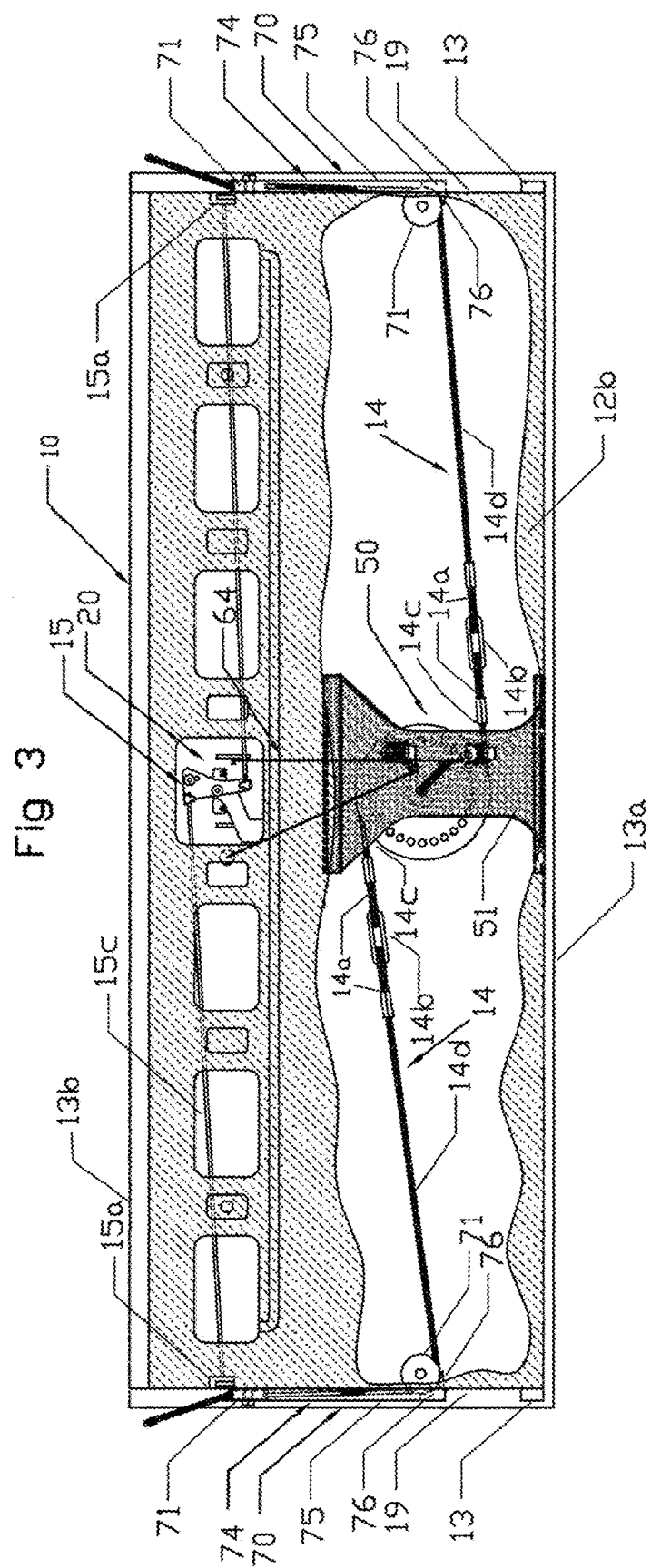

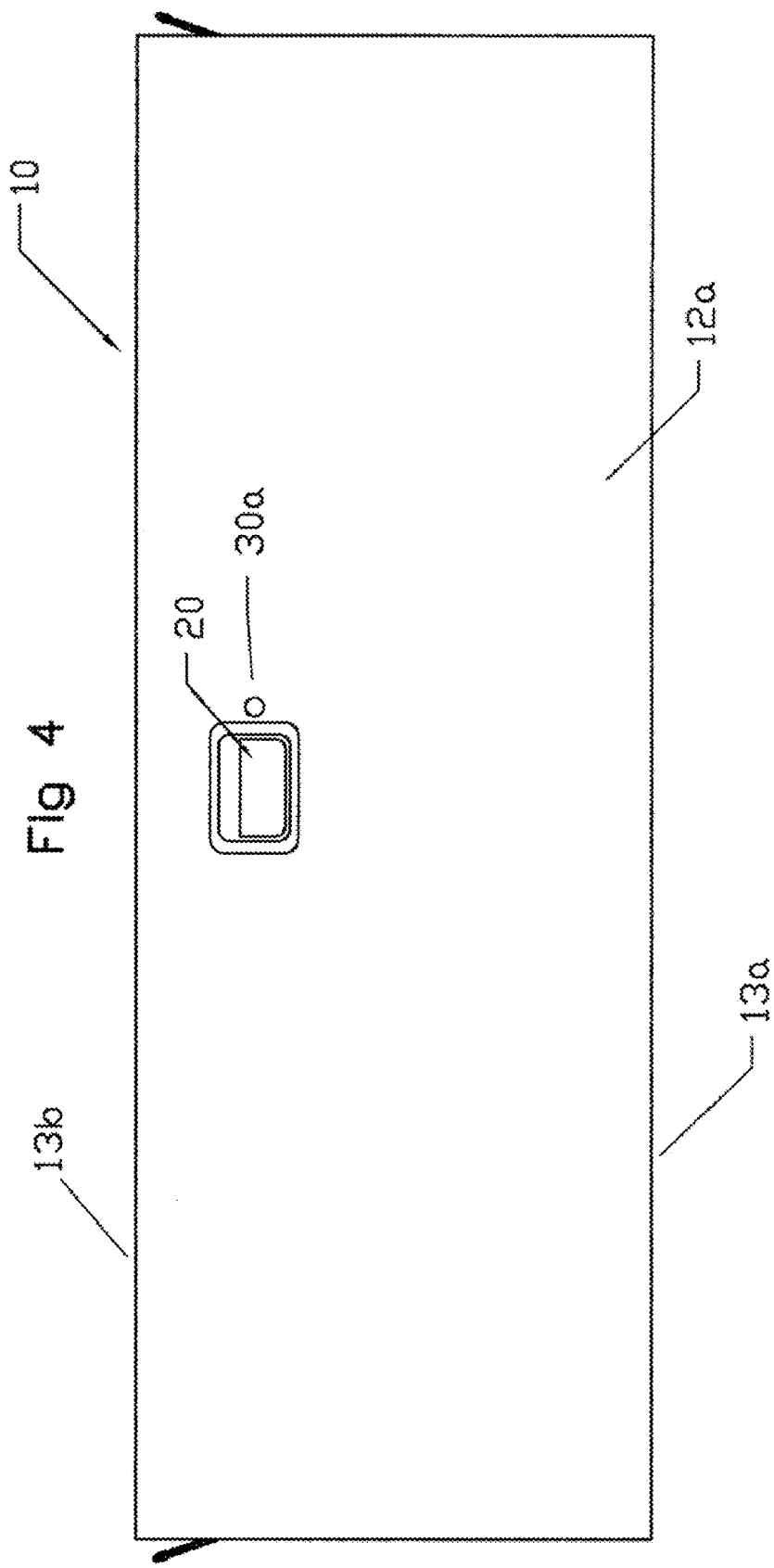

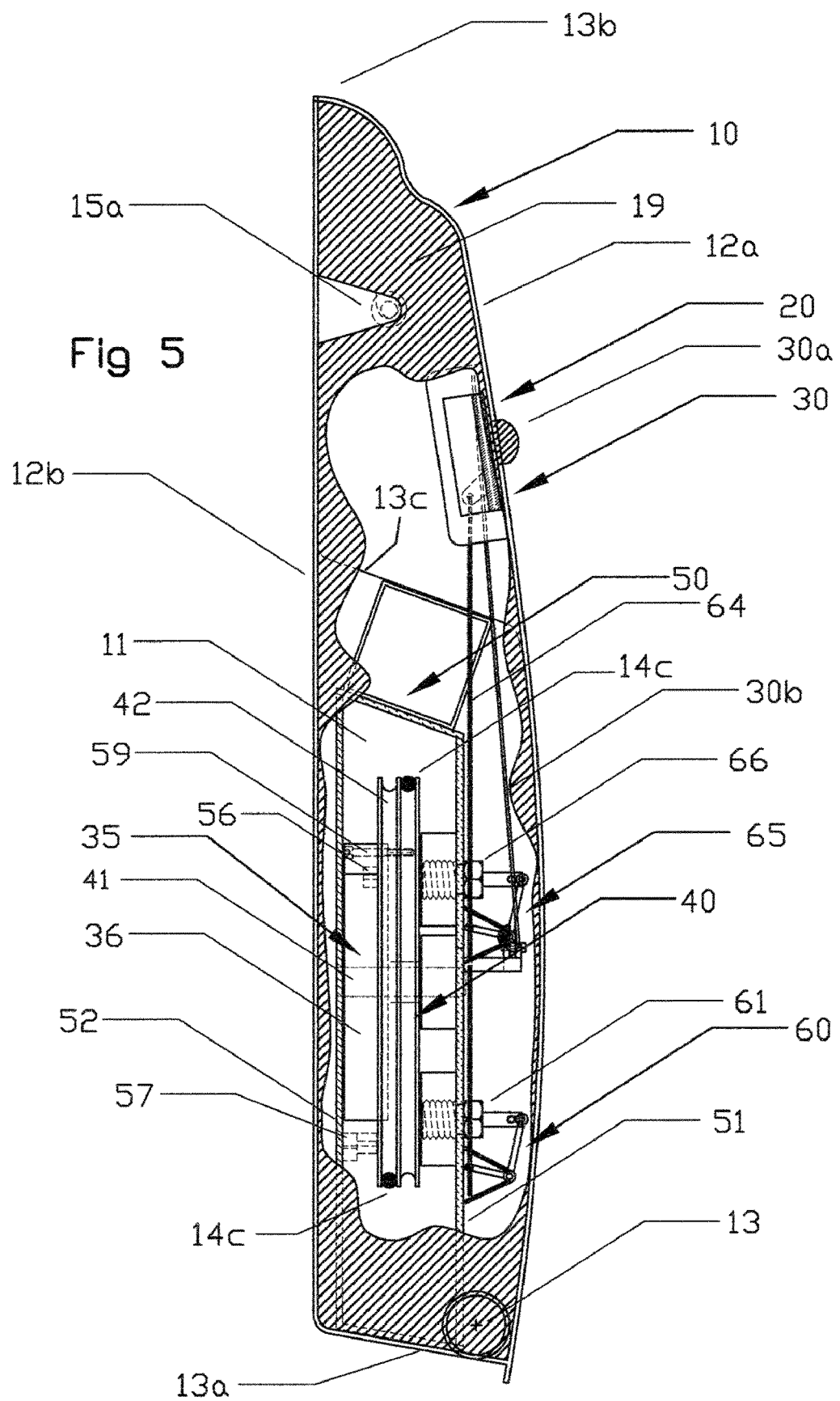

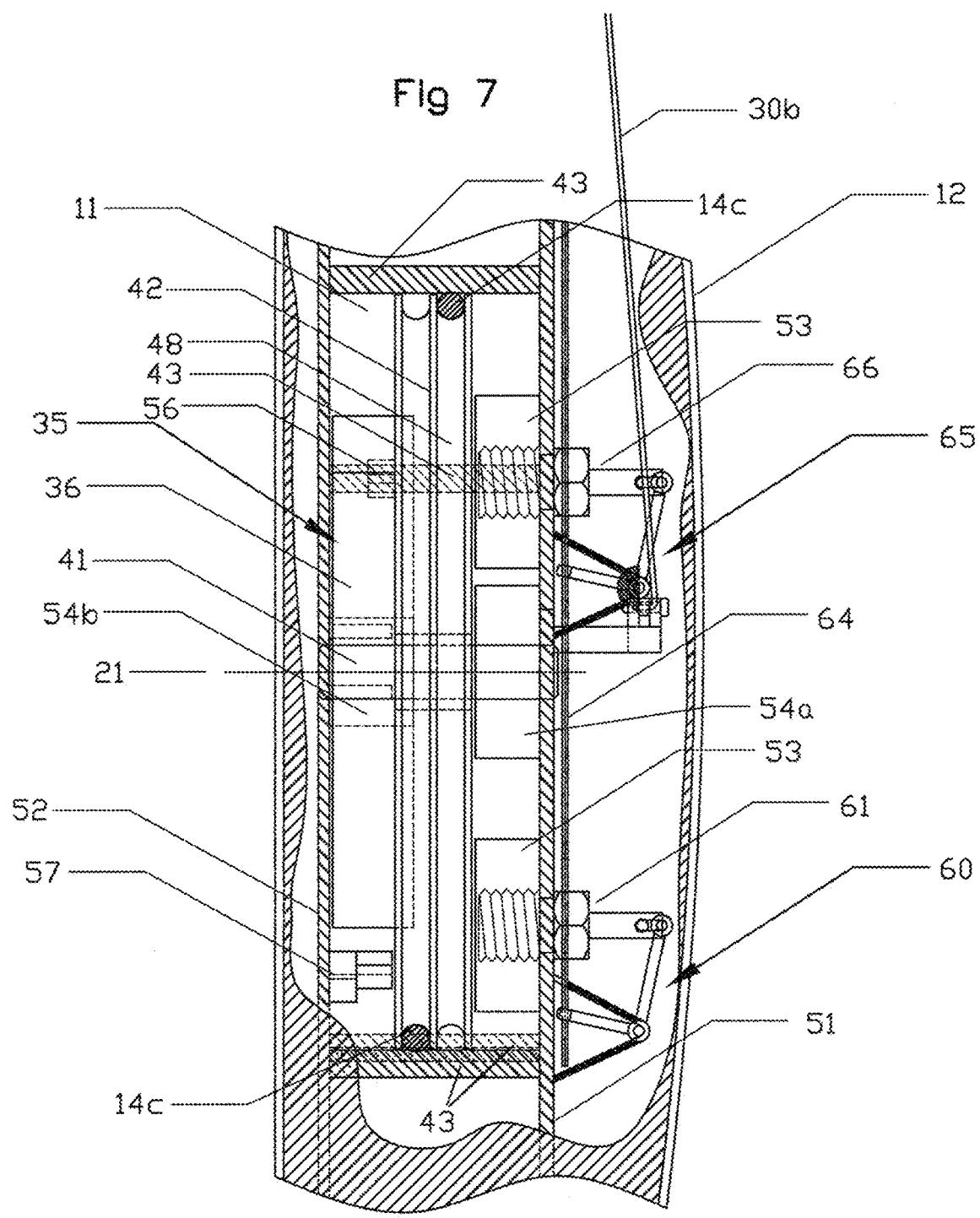

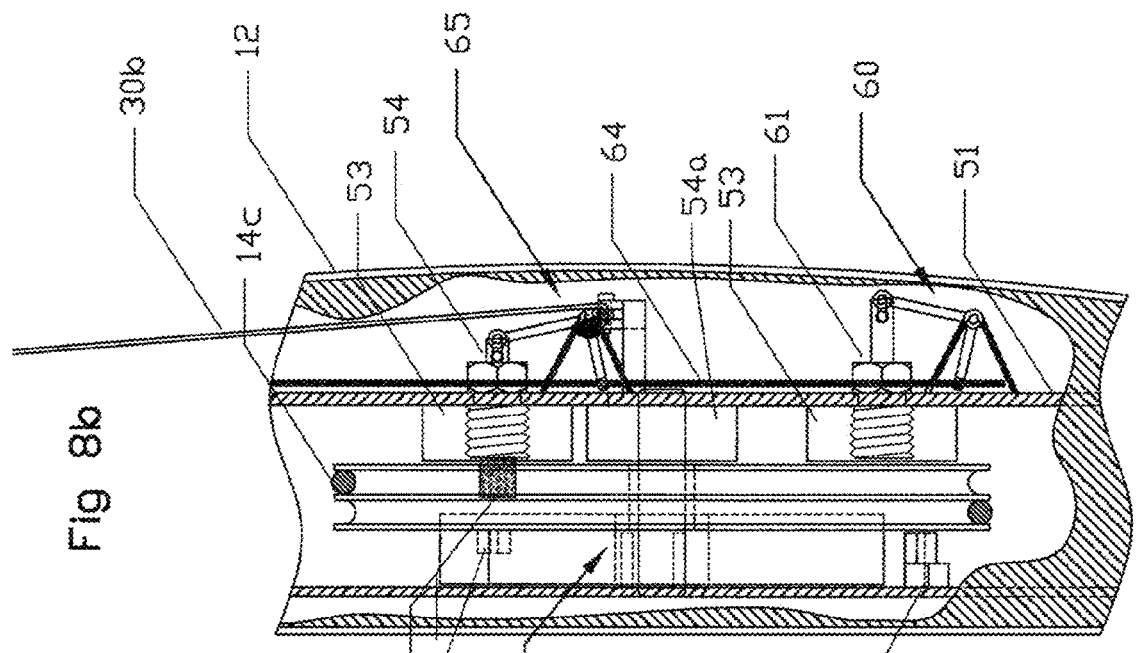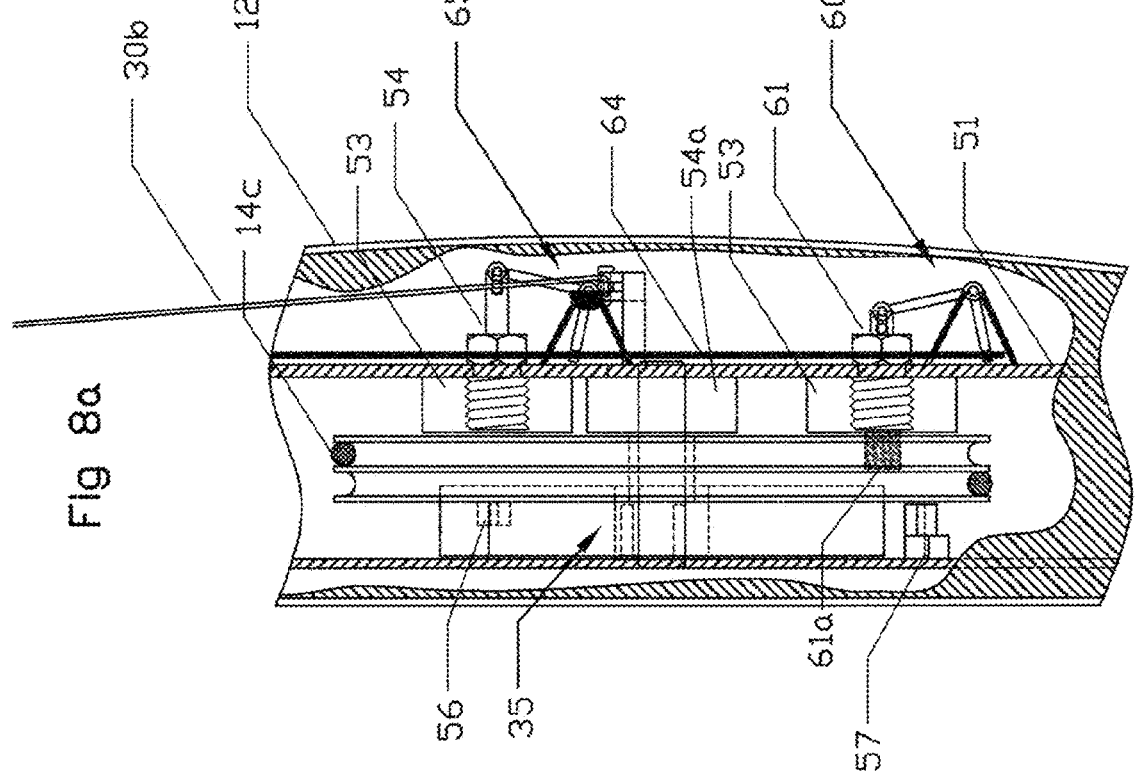

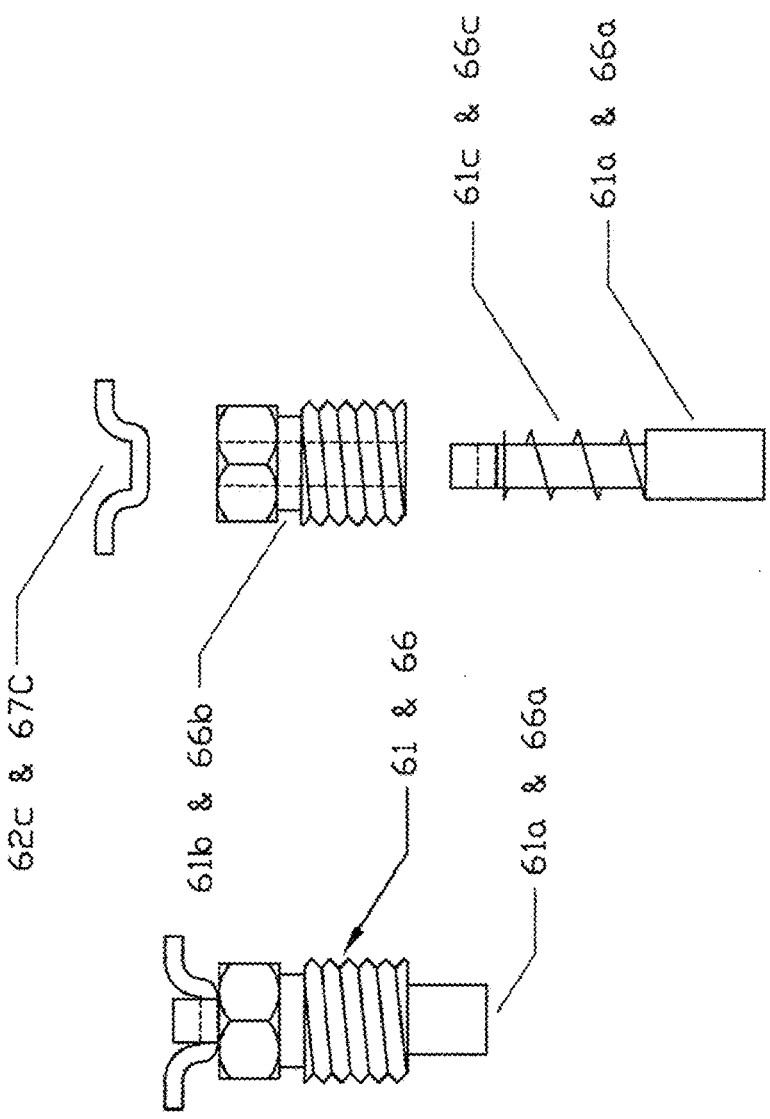

Fig 13
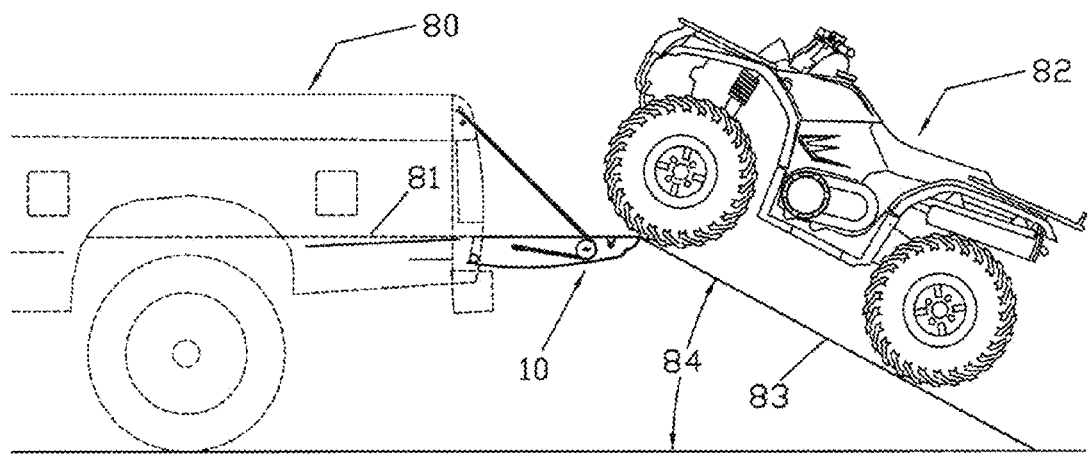
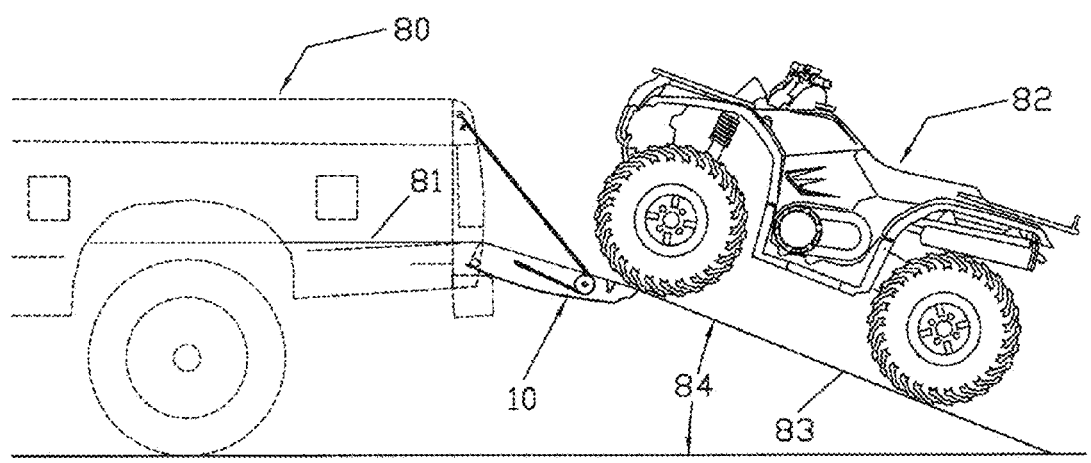

Fig 14
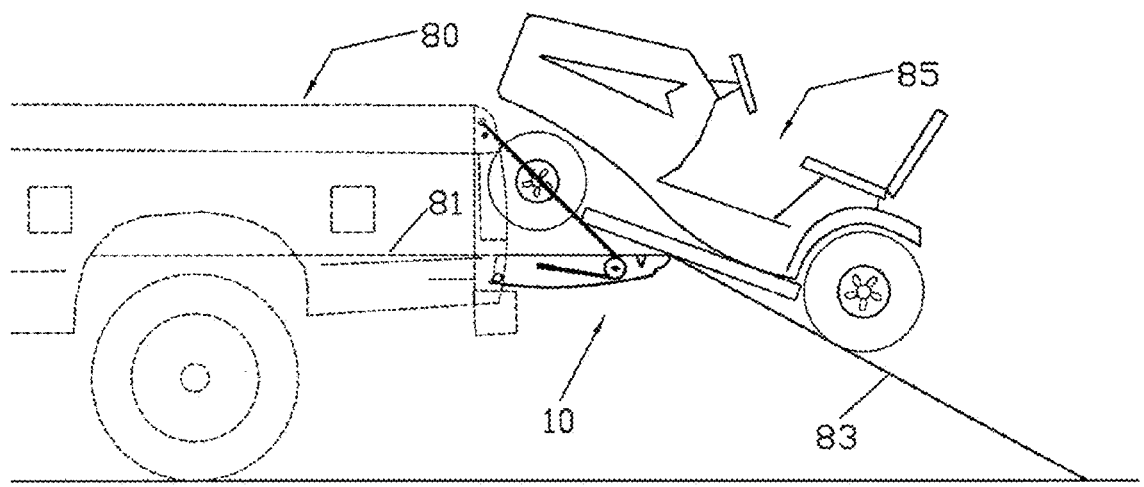
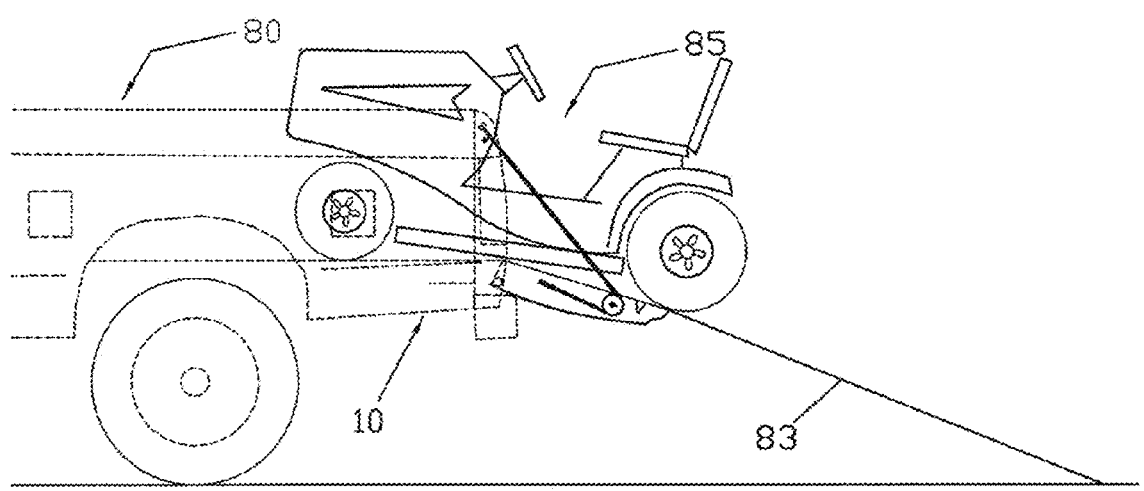

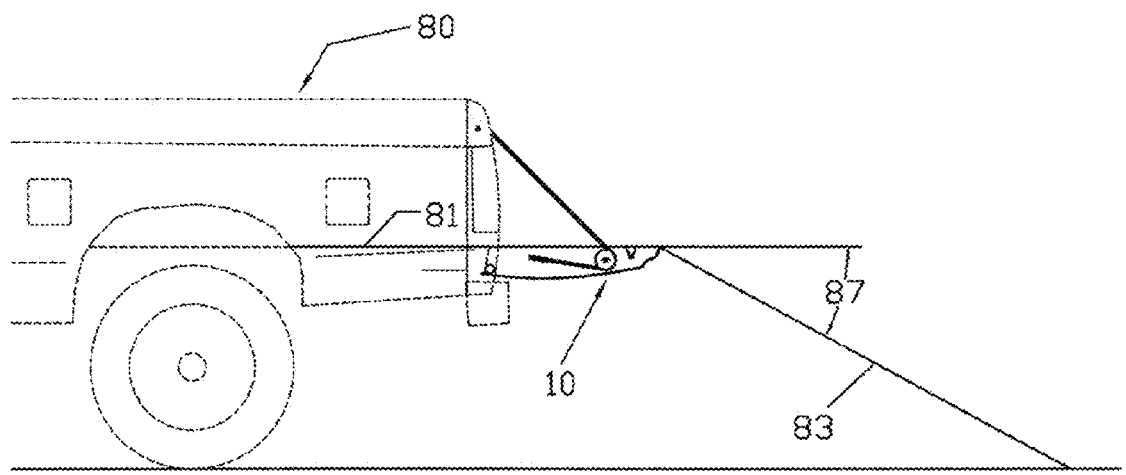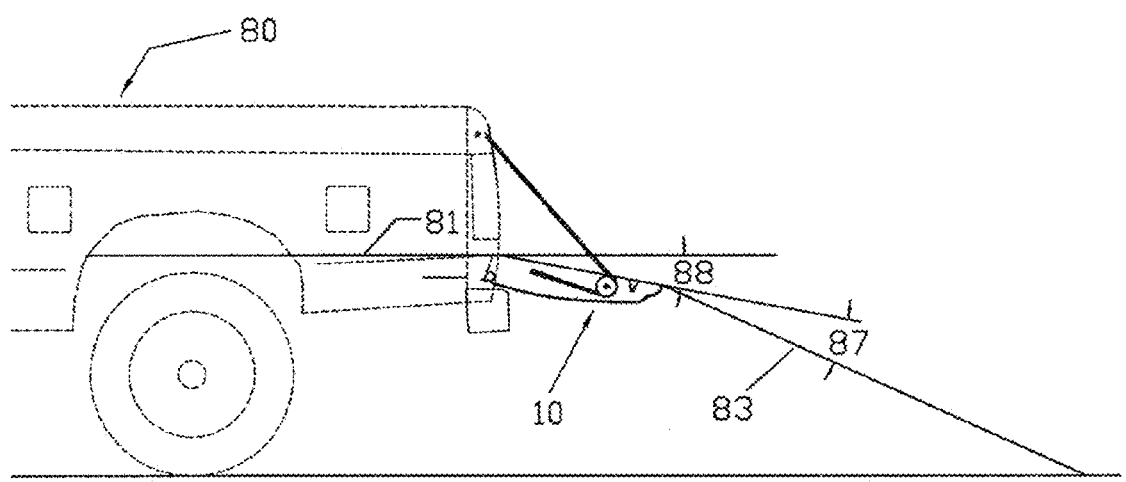

MULTI-POSITION TAILGATE RETAINING AND COUNTERBALANCING APPARATUS AND METHOD

BACKGROUND

Field of Invention

This invention relates to motor vehicles and utility trailers, and more particularly to apparatus and methods for a tailgate that may be easily lowered to multiple pre-selected positions, including positions lower than the standard open position, while retaining the tailgate's external appearance and full load carrying capacity.

With the continued sophistication of vehicle systems, tailgates are becoming increasingly heavy. To facilitate use of such heavy tailgates, various counterweight devices have been introduced. Certain tailgate counterweights use a torsion spring to store energy as the tailgate opens. Such devices, however, do not typically permit the tailgate to be secured in multiple positions, each retaining the tailgate's full load carrying capacity. Additionally, these devices do not typically support disengagement of the tailgate counterbalance to prevent the bouncing of a fully or partially open unloaded tailgate. Moreover, these devices do not provide or support a tailgate position lower than the conventional open position.

Other devices attempt to reduce the aerodynamic drag caused by a tailgate by partially opening it. However, these devices are not designed to support a load that is near or equal to the load carrying capacity of a conventional tailgate. They are only designed to support the tailgate against the force of wind caused by airflow when driving.

Other devices are mounted to a vehicle body and act upon the pivotable closure panel with a direct force. These types of devices are utilized on lift gates for vans and the like. These devices typically consume significant space and they must act on the closure panel at a distance from the hinge pivot bracket axis. Additionally, because they mount to the body structure, they hinder the removal of the lift gate or closure panel from the vehicle.

Still other devices facilitate the opening and closing of a tailgate through the use of electrically powered tailgate actuators. While these electric powered devices eliminate the physical stress of opening and closing the tailgate, they do not purport to, nor could they be easily adapted to allow load carrying capability in partially open positions or to allow the tailgate to be lowered below the generally horizontal position. These devices are designed only to move a tailgate between the closed position and the open position. Additionally, these electric powered devices are complex and expensive and may require sophisticated pinch detection electronics in order to be safely used.

In view of the foregoing, what is needed is a system for easily lowering a tailgate to multiple pre-selected positions (including positions lower than the standard open position), while retaining the tailgate's external appearance and full load carrying capacity.

SUMMARY

In selected embodiments, a system in accordance with the present invention may include a multi-position tailgate retaining and counterbalancing apparatus. The system may comprise a vehicle tailgate that opens and closes by rotating about a tailgate pivot axis in relation to a vehicle body, a latching mechanism that secures the tailgate to the pickup bed in the closed position, a latch release handle, and an energy storage device located within the tailgate. The system may further include a two-groove drive sheave that is connected to, and rotates around a common axis with, the energy storage device, locking mechanisms that secure the tailgate in selectable predetermined positions, a locking mechanism actuator, and a release link extending from the locking mechanisms to the conventional tailgate release handle.

In certain embodiments, the system may further include two opposing cable assemblies. Each cable of the opposing assemblies may connect at one end to different grooves in the two-groove drive sheave and at the other end to quick disconnect clips engaging the pickup truck bed. The cables may wind and unwind in opposite directions when the two-groove drive sheave rotates. Additional sheaves may guide the opposing cables from the two-groove drive sheave through the sides of the tailgate to the cable attachment points. The two opposing cable assemblies may maintain equal lengths throughout the rotation from fully closed to fully open. The relative pivoting of the tailgate with respect to the vehicle body may result in rotational or linear movement of the energy storage device, with maximum energy storage corresponding to the tailgate in the fully open position.

The energy storage device is a spiral torsion spring. The energy storage device may incorporate rotary damping in the opening direction to limit the opening velocity of the tailgate. The tailgate, after being released from the closed position by pulling and releasing the latch release lever, may be lowered to the conventional open position of 90 degrees from the closed position, where the tailgate will automatically stop and lock the counterbalance assembly. The tailgate, after being released from the conventional open position by again pulling and releasing the latch release lever, may be lowered further to a position where the leading or top edge thereof is lower than the conventional open position.

The tailgate may be positioned in multiple positions between closed and fully open by pushing an actuator button when the tailgate is near the desired position. The tailgate may retain its full load carrying capacity in all positions when the counterbalance assembly is locked. The tailgate rotation stops can be positioned so that the tailgate cannot be secured in the removal position (approximately 45 degrees from closed), thereby preventing the tailgate from coming unhinged when the corresponding vehicle hits a bump.

To facilitate the removal and reinstallation of the tailgate, the tension in the tailgate counterbalance cables may be eliminated with the tailgate in a near closed position. To easily adjust the cable assembly length each of the two cable assemblies may include two cable segments connected by a turnbuckle. To maximize the benefit of being able to use the tailgate in positions lower than the conventional open position, embodiments in accordance with the present invention could be packaged with a bumper accommodating a lower tailgate position.

Incorporation of a multi-position tailgate retaining and counterbalancing apparatus for pickup truck tailgates, utility trailers, and other motor vehicle closure panels need not negatively affect manufacturability and servicing of the vehicle. Moreover, a multi-position tailgate retaining and counterbalancing system in accordance with the present invention may be designed for selected vehicles without requiring substantial reworking and redesign of the vehicles' structure.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 3 is a partial cut-away view of the front facing surface of a closed tailgate in accordance with the present invention;

FIG. 4 is an elevation view of the rear facing surface of the tailgate of FIG. 3;

FIG. 5 is a partial cut-away view of the side of the tailgate of FIG. 3;

FIG. 7 is a partial cut-away, partial transparent view of the side of tailgate of FIG. 3 showing both the first and second sheave locks in an unengaged configuration;

FIG. 8a is a partial cut-away, partial transparent view of the tailgate of FIG. 3 showing the plunger pin of the first sheave lock engaged in a sheave locking pin aperture;

FIG. 8b is a partial cut-away, partial transparent side view of the tailgate of FIG. 3 showing the plunger pin of the second sheave lock engaged in a sheave locking pin aperture;

FIG. 10a is a side elevation view a plunger pin latch with the plunger pin in the unengaged position;

FIG. 10b is a side elevation view of a plunger pin latch with the plunger pin in the engaged position;

FIG. 10c is an exploded, side view of a plunger pin latch;

FIG. 13 provides two schematic side elevation views that collectively illustrate the ramp angle change due to the change in height of the leading or top edge of the tailgate;

FIG. 14 provides two schematic side elevation views that collectively illustrate the benefit of lowering the height of the leading or top edge of the tailgate when loading vehicles with low ground clearance;

FIG. 17 provides two schematic side elevation views that collectively illustrate the break over angle difference between the conventional open position and a fully open position in accordance with the present invention.

Figure 1:
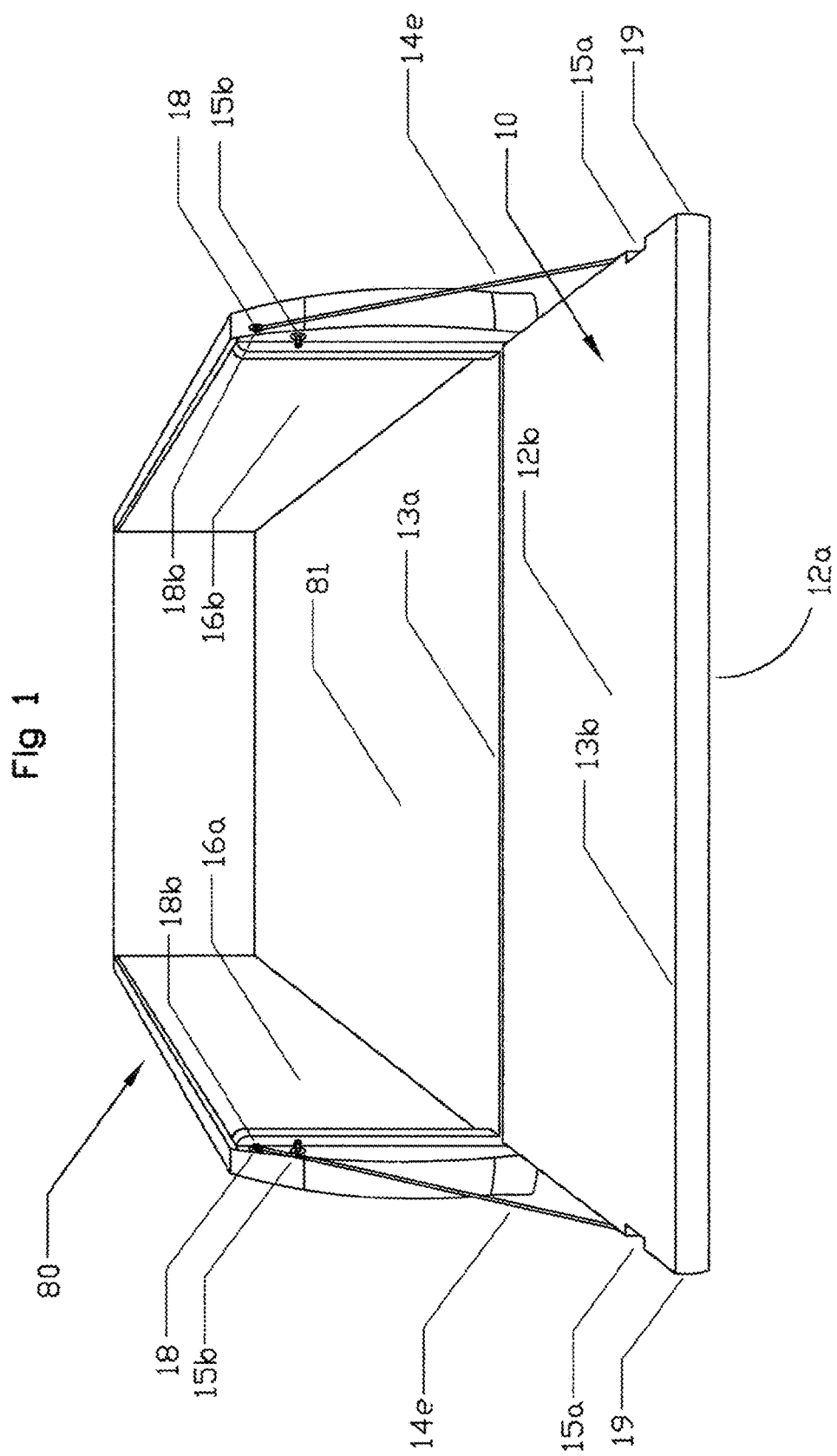
FIG. 1 is a perspective view of one embodiment of a truck bed with a tailgate in a conventional open position.

KEY FOR REFERENCE NUMERALS
CONTAINED IN DRAWINGS

10—tailgate
11—tailgate interior cavity
12—tailgate exterior
12a—rear facing exterior surface
12b—front facing exterior surface
13—tailgate pivot
13a—pivot edge
13b—leading edge
13c—interior tailgate support
14—flexible cord assembly
14a—threaded cable end
14b—flexible cord assembly length adjuster
14c—inner flexible cord segment
14d—outer flexible cord segment
14e—tailgate support cable
15—latch assembly
15a—latch receiving socket
15b—latch projecting rod
15c—latch linkage
16a—first side
16b—second side
17—angular range of motion
18—cord attachment point
18a—tailgate cable attachment clip
18b—tailgate cable attachment stud
19—tailgate side
20—first actuator
21—rotating axis
22—first radial distance
23—second radial distance
30—second actuator
30a—second actuator button
30b—restraint release linkage
31—plunger pin restraint mechanism
32—latch lever frame
33—latch
33a—hemispherical stop
33b—latch lever
35—counterbalance assembly
36—energy storage device
40—sheave assembly
41—shaft
42—two-groove drive sheave
43—two-groove drive sheave cord guard
45—second position sheave locking pin aperture
46—third position sheave locking pin aperture
47—fourth position sheave locking pin apertures
48—sheave groove
50—frame
51—sheave lock side frame
52—spring side frame
53—sheave lock boss
54a—shaft receiver boss
54b—spring and shaft receiver boss
55—shaft receiver boss screw
56—sheave stop
57—frame stop
59—shoulder screw
60—first sheave lock
61—first plunger pin latch
61a—first plunger pin
61b—plunger pin housing
61c—plunger pin spring
62—first release lever 62a—lever leg
62b—axle housing
62c—release lever link
63—first release lever frame
63a—frame axle
64—release linkage
65—second sheave lock
66—second plunger pin latch
66a—second plunger pin
66b—plunger pin housing
66c—plunger pin spring
67—second release lever
67a—lever leg
67b—axle housing
67c—release lever link
68—second release lever frame
68a—frame axle
70—flexible cord guide assembly
71—flexible cord guide sheave
72—flexible cord attachment pocket
73—set screw
74—sheave guard/cord guide assembly
75—sheave guard
76—cord guide
80—pickup truck type motor vehicle bed
81—bed floor
82—All Terrain Vehicle (ATV)
83—loading ramp
84—loading ramp angle
85—riding lawn mower
86—loading dock
87—break over angle
88—tailgate decline angle

DETAILED DESCRIPTION OF SELECTED EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, vehicle beds 80 may include a tailgate 10, first side 16a, second side 16b, tailgate support cables 14e, and a bed floor 81. The tailgate 10 may have a rear-facing, exterior surface 12a and front-facing exterior surface 12b. The tailgate 10 may be pivotable about tailgate pivot 13 and have a pivot edge 13a and a leading or top edge 13b. The tailgate 10 may be supported in the open position by the tailgate support cables 14e.

Figure 2A:
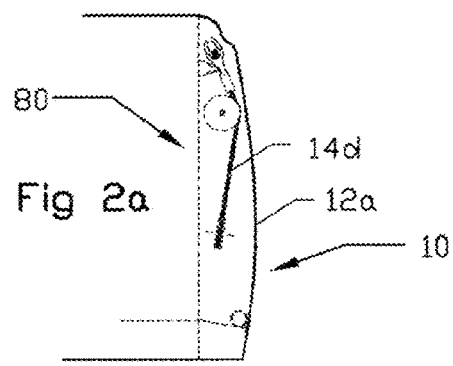
FIGS. 2a through 2f are partial side views of the truck bed and tailgate of FIG. 1 with the tailgate in various locked positions ranging from a fully closed position (FIG. 2a) to a fully open position (FIG. 2c) of greater then ninety degrees rotation from the closed position.
Figure 2B:
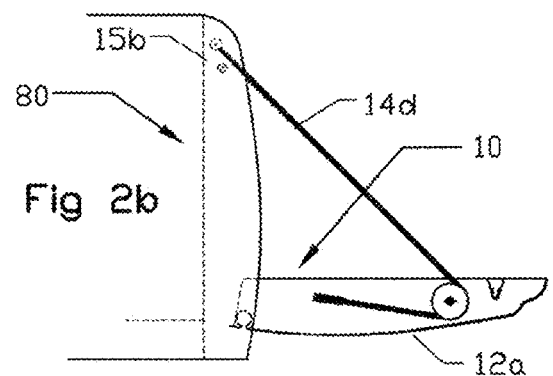
Figure 2C:
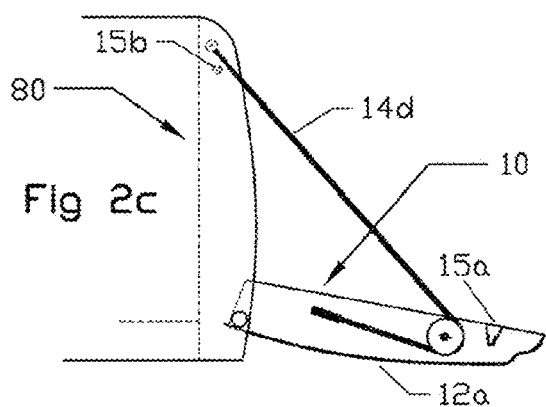
Figure 2D:
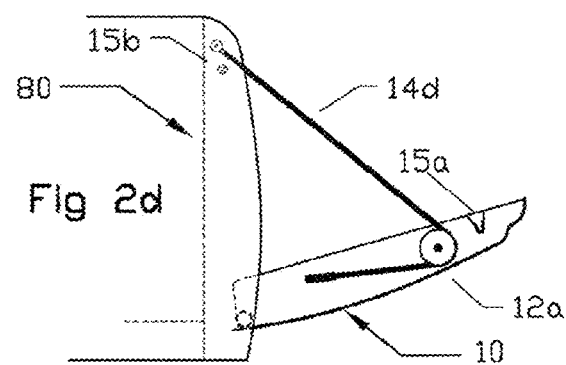
Figure 2E:
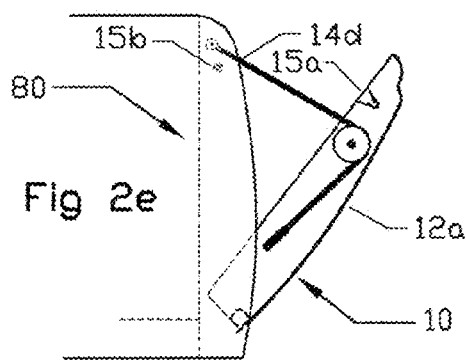
Figure 2F:
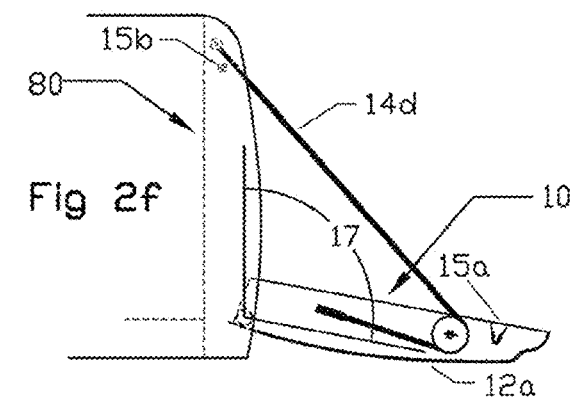
Figure 6:
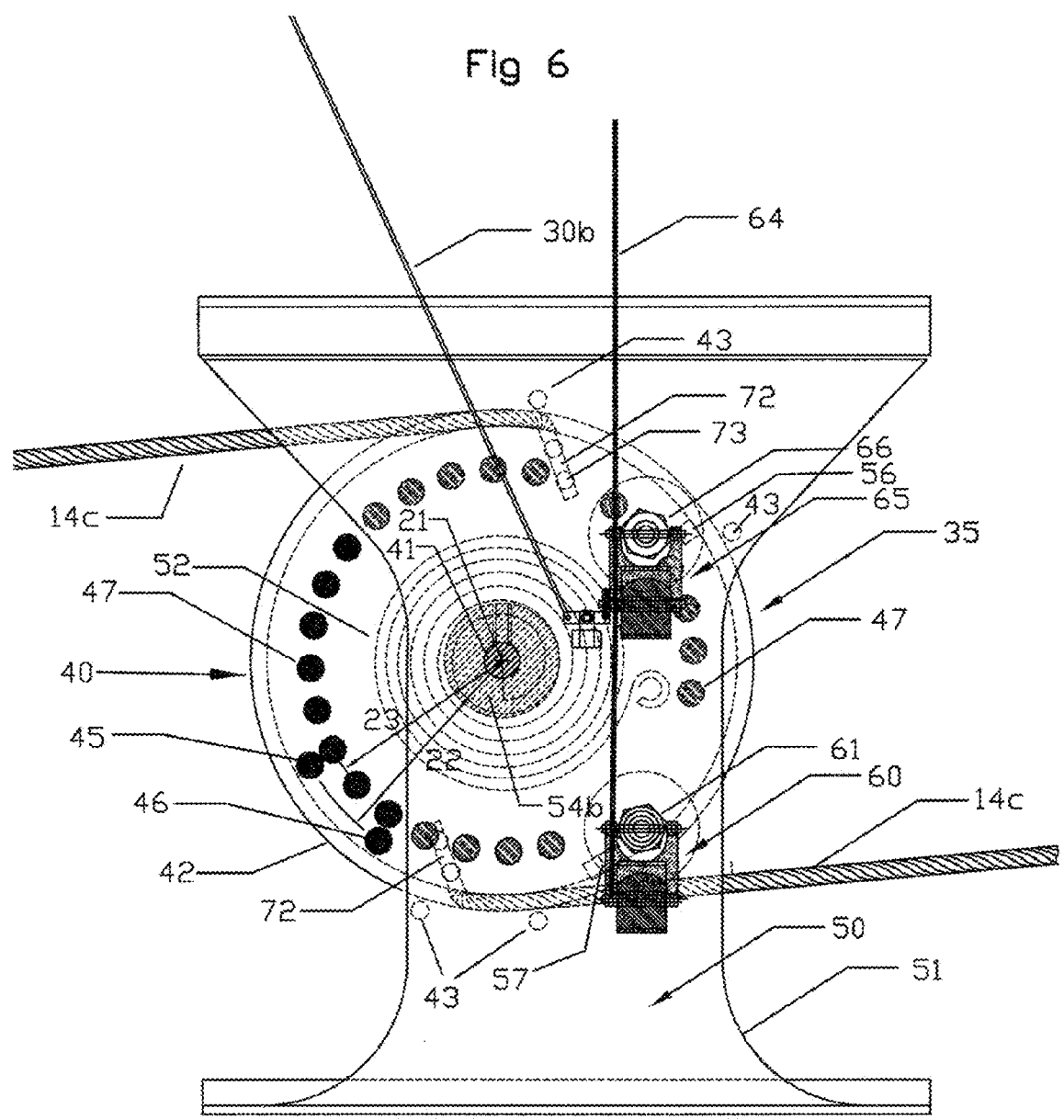
FIG. 6 is a rear facing transparent view of a sheave assembly in accordance with the present invention.
Figure 9B:
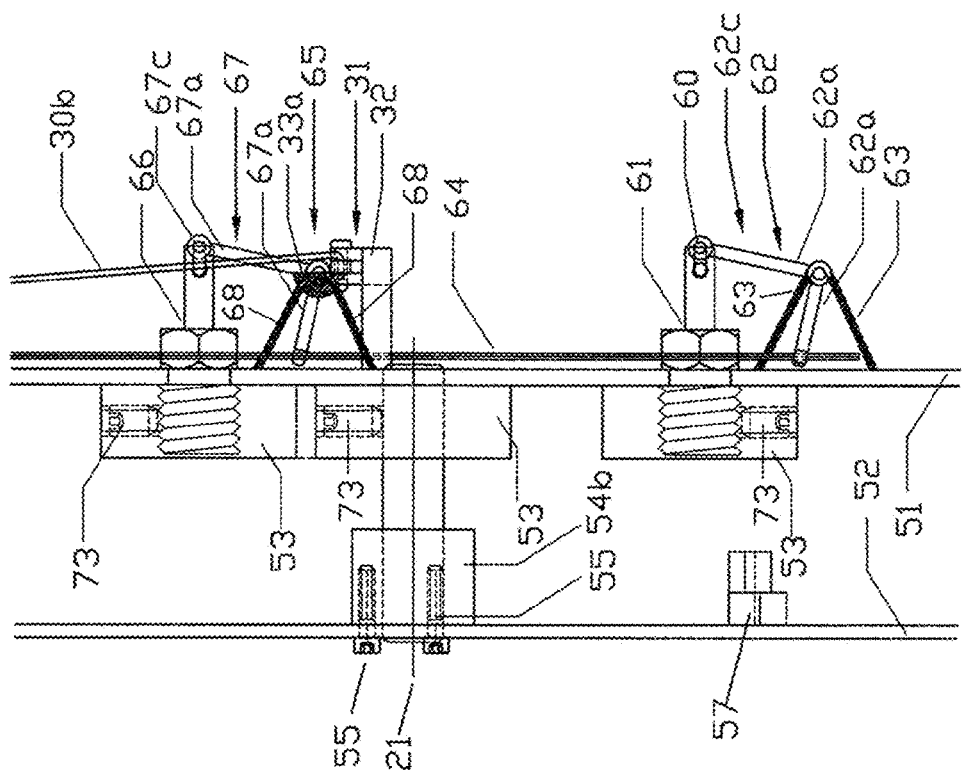
FIG. 9b is a partial, transparent side view of the sheave locks and frame, with the two-groove drive sheave and spring removed for clarity.
Figure 9A:
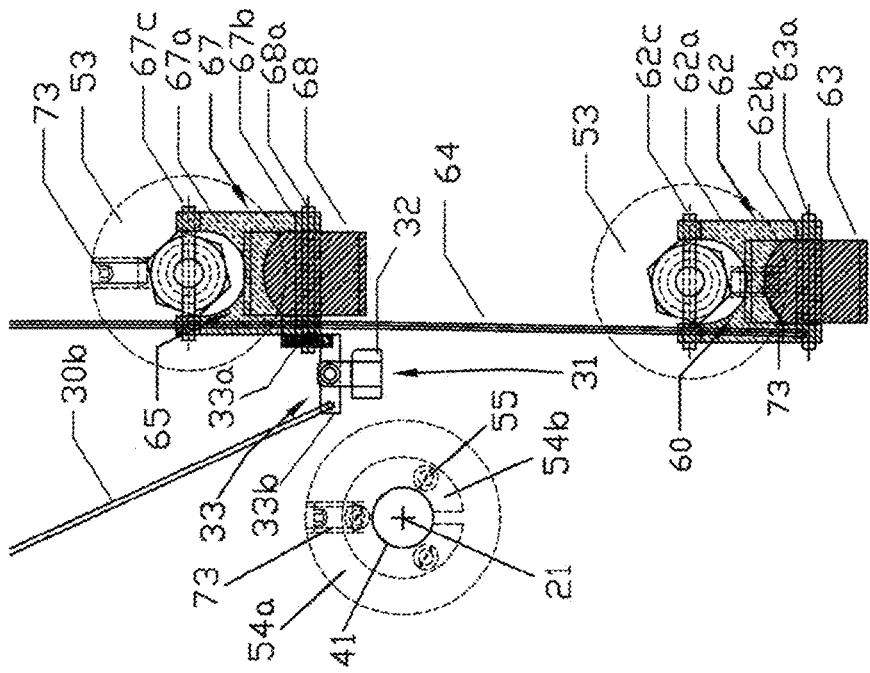
FIG. 9a is a rear facing, transparent view of the first and second sheave locks and frame, with the two-groove drive sheave and spring removed for clarity.
Figure 11:
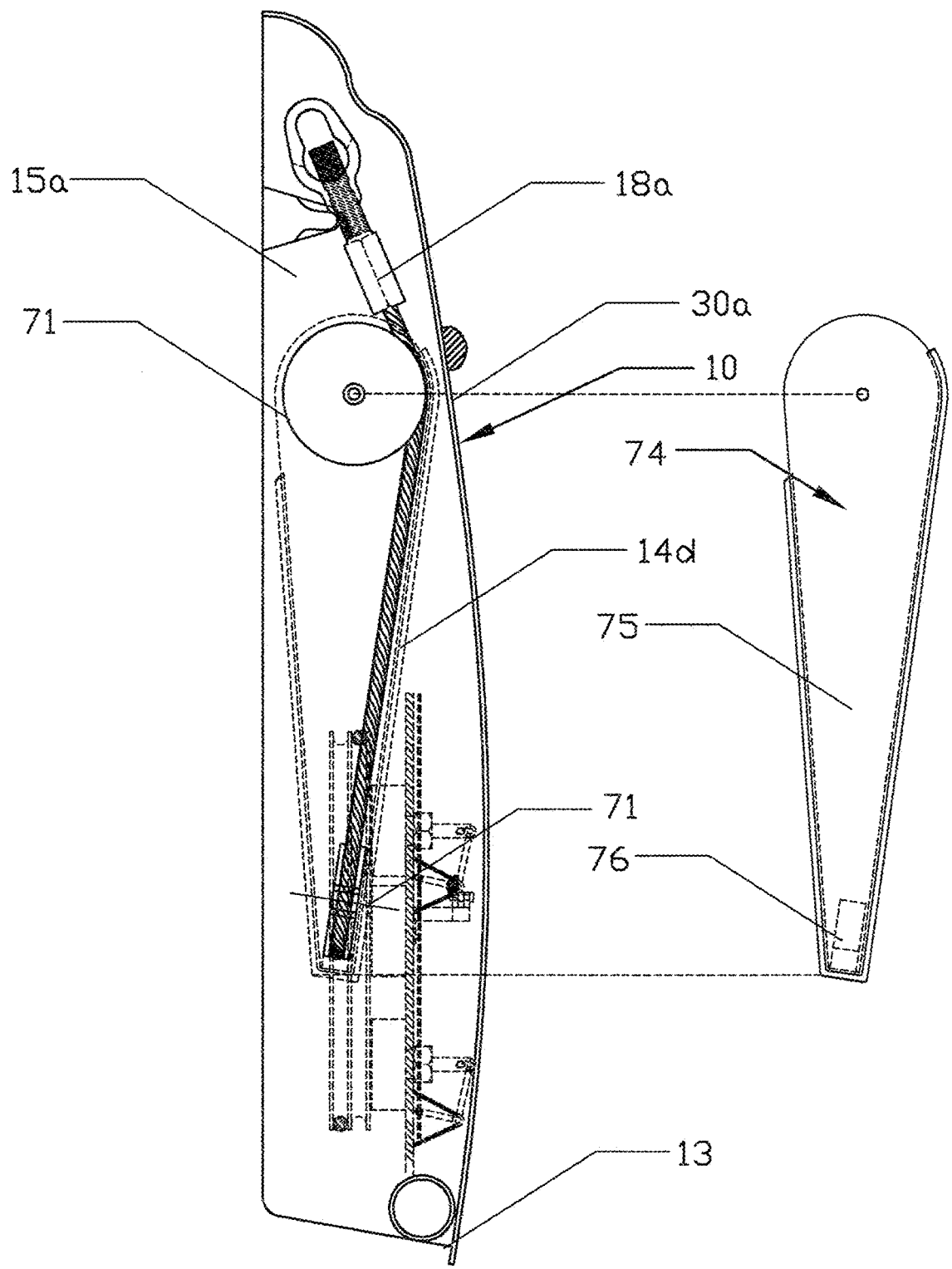
FIG. 11 is a partial, transparent, side view of the flexible cord guide assembly, with the sheave guard/cord guide assembly removed from the tailgate for clarity.

Referring to FIGS. 1 through 4, a tailgate latch assembly 15 may be provided for latching the tailgate 10 in the first or closed position (i.e., the position illustrated in FIG. 2a). A latch assembly 15 may include latch receiving sockets 15a located on the sides of the tailgate 10 near the leading edge 13b. The latch receiving sockets 15a may engage latch projecting rods 15b to secure the tailgate 10 in the closed position.

A latch assembly 15 may further include a latch release handle or first actuator 20 which, when grasped and lifted, pulls certain latch linkages 15c and disengages the latch receiving sockets 15a from the latch projecting rods 15b. In this manner, the tailgate 10 may be release from the closed position and be free to move another position within its angular range of motion 17. In selected embodiments, a tailgate 10 may pivot about tailgate hinge pivot 13 between a first, generally vertical, closed position and a second, fully open position (i.e., the positions illustrated in FIGS. 2a, 2c) that is lower than a third, conventional open position (i.e., the position illustrated in FIG. 2b) that is about 90 degrees of rotation from the closed position.

Referring to FIGS. 3 through 11, an apparatus 35 according to the present invention may comprise a multi-position tailgate retaining and counterbalancing assembly 35. A multi-position tailgate retaining and counterbalancing assembly 35 may be installed within the tailgate interior cavity 11 of a tailgate 10. Such an assembly 35 may reduce the effort required to open and close a tailgate 10. It may also allow the tailgate 10 to be locked in multiple predetermined positions.

In selected embodiments, a multi-position tailgate retaining and counterbalancing assembly 35 may include: an energy storage device 36 coupled to a sheave assembly 40; two flexible cord assemblies 14 that run from the sheave assembly 40 to the cord attachment points 18; two low friction flexible cord guide assemblies 70 that guide the outer flexible cord segments 14d from the sheave assembly 40 through the tailgate interior cavity 11 and the tailgate sides 19 toward the cord attachment points 18; a sheave guard/cord guide assembly 74 that protects the flexible cord guide sheaves 71 and prevents the outer flexible cord segments 14d from becoming dislodged from the guide sheaves 71 when the outer flexible cord segments 14d are slack; a first sheave lock 60; a second sheave lock 65; a first and second sheave lock release linkage 64 that connects the latch assembly 15 to the first and second sheave locks 60, 65; a first actuator 20; and a second actuator 30.

Both the energy storage device 36 and the sheave assembly 40 may be located entirely within the interior cavity 11 of a tailgate 10. In selected embodiments, the energy storage device 36 may be or comprise a spiral torsion spring. Such a spring may be attached by a shoulder screw 59 at one end thereof to the two-groove drive sheave 42. The other end of the spring may be attached to the spring and shaft receiver boss 54b.

In certain embodiments, a sheave assembly 40 may include a two-groove drive sheave 42, a shaft 41, and a frame 50. The two-groove drive sheave 42 may rotate about a rotating axis 21. The two flexible cord assemblies 14 (e.g., vinyl coated cables) may unwind in opposite directions as the tailgate 10 is lowered from the first, closed position toward the second, fully open position. This may cause the energy storage device 36 to be loaded with energy.

Loading the energy storage device 36 may reduce the upward force a person may be required to exert on the tailgate 10 to slow the downward motion of the tailgate 10 toward the second, fully open position. Unloading the energy storage device 36 as the tailgate 10 is raised toward the first, closed position may reduce the upward force a person may be required to exert on the tailgate 10.

In selected embodiments, a two-groove drive sheave 42 in accordance with the present invention may include a first plurality of apertures. In one embodiment, the first plurality of apertures may include the second position sheave locking pin aperture 45 (for locking a tailgate 10 in the second, fully open position) and the third position sheave locking pin aperture 46 (for locking a tailgate 10 in the third, conventional, open position). These apertures 45, 46 may be spaced a first radial distance 22 from the rotating axis 21.

Additionally, a two-groove drive sheave 42 may include a second plurality of apertures. For example, a two-groove drive sheave 42 may include an array of fourth position sheave locking pin apertures 47, each spaced a second radial distance 23 from the rotating axis 21. These apertures 47 may support locking of the tailgate 10 in an array of positions between the first, closed position and the second, fully open position.

The diameter of the two-groove drive sheave 42 may be sized such that it rotates less than 360 degrees when the tailgate 10 is pivoted through its full angular range of motion 17 (i.e., from the first, closed position to the second, fully open position). By sizing the two-groove drive sheave 42 so that it rotates less than 360 degrees, selected embodiments in accordance with the present invention may ensure that engagement between the first plunger pin 61a and one of the second or third locking pin apertures 45, 46 or between the second plunger pin 66a in one of the array of locking pin apertures 47 results in a unique tailgate position. This may also allow for a redundant sheave stop 56. A sheave stop 56 may be attached to the two-groove sheave 42 to provide a redundant stop should the first sheave lock 60 fail. The sheave stop 56 may stop rotation of the two-groove drive sheave 42 when it contacts the frame stop 57.

In selected embodiments, a frame 50 may be formed of metal. The frame 50 may include two parallel, flat surfaces, namely, a sheave lock side frame 51 and a spring side frame 52. A sheave lock side frame 51 may include two sheave lock bosses 53 and a shaft receiver boss 54a secured thereto or formed integrally therewith. One end of a shaft 41 may secured to the shaft receiver boss 54a by a set screw 73. A spring side frame 52 may include a spring and shaft receiver boss 54b secured thereto by three shaft receiver boss screws 55. The spring and shaft receiver boss 54b may include a notch cut therethrough to secure the inside end of the torsion spring. A frame 50 may be secured on one end to the interior surface of a pivot edge 13a of a tailgate 10. The other end of the frame 50 may be secured to the interior tailgate support 13c within the tailgate interior cavity 11. In certain embodiments, four two-groove sheave cord guards 43 may be secured between the sheave lock side frame 51 and the spring side frame 52. The two-groove sheave cord guards 43 may prevent the inner flexible cord segments 14c from becoming dislodged from their respective sheave grooves 48 when the inner flexible cord segments 14c are slack.

In selected embodiments, each flexible cord assembly 14 may be secured at one end in the flexible cord attachment pockets 72 by a pair of set screws 73. The other ends of the flexible cord assemblies 14 may be secured to a tailgate cable attachment stud 18b at the cord attachment point 18 by a conventional tailgate cable attachment clip 18a.

Each flexible cord assembly 14 may include two flexible cord segments, namely, the inner flexible cord segment 14c and the outer flexible cord segment 14d. These segments 14c, 14d may be connected by a flexible cord assembly length adjuster 14b (e.g., a turnbuckle). An inner flexible cord segment 14c may have a bare end secured in a flexible cord attachment pocket 72 by a pair of set screws 73. The other end may include a threaded cable end 14a (e.g., left hand threaded cable end) threaded into one end of the flexible cord assembly length adjuster 14b. An outer flexible cord segment 14d may include a threaded cable end 14a (e.g., right hand threaded cable end) threaded into the opposite end of the flexible cord assembly length adjuster 14b. The other end of the outer flexible cord segment 14d may engage or terminate with a tailgate cable attachment clip 18a.

In selected embodiments, the two low friction flexible cord guide assemblies 70 may each include two flexible cord guide sheaves 71. The two flexible cord guide sheaves 71 may cooperate to hold the flexible cords segments 14c, 14d of the corresponding flexible cord assembly 14 in proper alignment with the sheave grooves 48 and cord attachment points 18. Flexible cord attachment pockets 72 may be located opposite each other such that when a tailgate 10 is in the second, fully open position, the inner flexible cord segments 14c may extend radially out from the two-groove drive sheave 42 in opposite directions.

In certain embodiments, each sheave guard/cord guide assembly 74 may include a sheave guard 75 protecting the flexible cord guide sheaves 71 and preventing the outer flexible cord segment 14d from leaving the guide sheave 71 nearest the leading edge 13b when the outer flexible cord segment 14d is slack. Each sheave guard/cord guide assembly 74 may also include two cord guides 76 preventing the outer flexible cord segment 14d from becoming dislodged from the guide sheave 71 nearest the pivot edge 13a when the outer flexible cord segment 14d is slack. One such cord guide 76 may be located on the outside of the tailgate side 19, while the other cord guide 76 may be located on the inside of the tailgate side 19.

A first sheave lock 60 in accordance with the present invention may include a first plunger pin latch 61 biased toward an engaged position, a first release lever 62, and a first release lever frame 63. The first plunger pin latch 61 may be secured in a sheave lock boss 53. The first plunger pin latch 61 may include a first plunger pin 61a, a plunger pin housing 61b, and a plunger pin spring 61c.

The center of a first plunger pin 61a may be located at the same radius from the rotating axis 21 of the shaft 41 as the center of the second and third position sheave locking pin apertures 45, 46. The diameter of the first plunger pin 61a may be sized slightly smaller than the second and third position sheave locking pin apertures 45, 46. The plunger pin housing 61b may be secured in a sheave lock boss 53 by a set screw 73. The first plunger pin 61a and the plunger pin spring 61c may be mounted inside the plunger pin housing 61b. The first plunger pin 61a may be held in the unengaged position by the non-apertured surface of the two-groove sheave 42.

In selected embodiments, a first release lever 62 may include two lever legs 62a secured to an axle housing 62b ninety degrees from each other. A release lever link 62c may connect the first release lever 62 to the first plunger pin 61a. The first release lever 62 may rotate about a frame axle 63a secured to the first release lever frame 63. The first release lever frame 63 may be mounted to the frame 50.

As a tailgate 10 in accordance with the present invention is pivoted away from the first, closed position and toward the third, conventional open position, the flexible cord assemblies 14 unwind and cause the two-groove drive sheave 42 to rotate. This rotation may continue until the third position sheave locking pin aperture 46 aligns with the first plunger pin 61a. Upon reaching such an alignment, the first plunger pin 61a may automatically extend to engage the third position sheave locking pin aperture 46. This may lock the sheave assembly 40 against further rotation and prevent the tailgate 10 from pivoting lower. The counterbalance force may be nullified when the sheave assembly 40 is locked in place.

The first plunger pin 61a is released from the third position sheave locking pin aperture 46 by pulling the latch release handle or first actuator 20 located in the upper center of the rear facing exterior surface 12a. When actuated, the first actuator 20 may pull the release linkage 64, which may rotate the first release lever 62 and disengage the first plunger pin 61a from the third position sheave locking pin aperture 46.

When the tailgate 10 is pivoted away from the third, conventional open position and toward the second, fully open position, the flexible cords assemblies 14 may further unwind and cause the two-groove sheave 42 to rotate further. This rotation may continue until the second position sheave locking pin aperture 45 is aligned with the first plunger pin 61a. When such alignment is reached, the first plunger pin 61a may automatically extend to engage the second position sheave locking pin aperture 45. This may lock the sheave assembly 40 and prevent the tailgate 10 from pivoting lower.

The first plunger pin 61a is released from the second position sheave locking pin aperture 45 by pulling the latch release handle or first actuator 20. When actuated, the first actuator 20 may pull the release linkage 64, which may rotate the first release lever 62 and disengage the first plunger pin 61a from the second position sheave locking pin aperture 45.

In selected embodiments, a second sheave lock 65 may include a second plunger pin latch 66 biased towards an engaged position, a second release lever 67, a second release lever frame 68, a second actuator 30, and a plunger pin restraint mechanism 31. The second plunger pin latch 66 may include a second plunger pin 66a, a plunger pin housing 66b, and a plunger pin spring 66c. The center of the second plunger pin 66a may be located at the same radius from the axis of the shaft 41 as the center of the array of fourth position sheave locking pin apertures 47. The diameter of the second plunger pin 66a may be sized slightly smaller than diameters of the various apertures of the array of fourth position sheave locking pin apertures 47. The plunger pin housing 66b may be secured in a sheave lock boss 53 by a set screw 73. The second plunger pin 66a and the plunger pin spring 66c may be secured inside the plunger pin housing 66b.

A second release lever 67 may include two lever legs 67a secured to an axle housing 67b ninety degrees from each other. A release lever link 67c may connect the second release lever 67 to the second plunger pin 66a. The second release lever 67 may rotate about the frame axle 68a secured to the second release lever frame 68. The second release lever frame 68 may be mounted to the frame 50.

In certain embodiments, a second actuator 30 may include a second actuator button 30a and a restraint release linkage 30b. The second actuator button 30a may be located adjacent the first actuator 20 in the upper center of the rear facing exterior surface 12a of a tailgate 10. The second actuator button 30a may be biased to return to its pre-actuated position after being actuated. The second actuator button 30a may be connected to a plunger pin restraint mechanism 31 by a restraint release linkage 30b. This may be done in such a manner that the bias in the second actuator button 30a may be communicated to the plunger pin restraint mechanism 31.

A plunger pin restraint mechanism 31 may include a latch lever frame 32 and a latch 33 utilizing a hemispherical stop 33a mounted on the second release lever 67. The hemispherical stop 33a may engage a latch lever 33b. The latch lever frame 32 may be secured to the frame 50. In selected embodiments, the latch lever 33b may be secured to the latch lever frame 32 in a manner that allows the latch lever 33b to pivot from an engaged position engaging the hemispherical stop 33a to a disengaged position releasing the hemispherical stop 33a. In such a disengaged position, the second plunger pin 66a may be free to engage an aperture of the array of fourth position sheave locking pin apertures 47.

Due to the translated bias from the second actuator button 30a, a latch lever 33b may be biased towards the engaged position. A plunger pin restraint mechanism 31 may prevent the second plunger pin 66a from engaging an aperture of the array of locking pin apertures 47. This may continue until the plunger pin restraint mechanism 31 is released by pressing the second actuator button 30a.

In selected embodiments, the center of the second plunger pin 66a may be located at the same radius from the rotating axis 21 of the shaft 41 as the center of the array of sheave locking pin apertures 47. Accordingly, as a tailgate 10 in accordance with the present invention pivots away from or toward the first, closed position, the flexible cords assemblies 14 unwind or wind, respectively. This may continue until the tailgate 10 is pivoted to a position that is close to the desired position.

When that position is reached, a user may actuate the second actuator 30 by pressing the second actuator button 30a. This may cause the plunger pin restraint mechanism 31 to release the second plunger pin 66a. The tailgate may then be pivoted slightly up or down allowing the second plunger pin 66a to become aligned with, and extend to engage, a proximate aperture of the array of fourth position sheave locking pin apertures 47. In such a manner, the sheave assembly 40 may prevent the tailgate 10 from pivoting lower.

In certain embodiments, the second plunger pin 66a may be released from an aperture of the array of fourth position sheave locking pin apertures 47 by pulling the latch release handle or first actuator 20. When actuated, the first actuator 20 may pull release linkage 64, which may rotate the second release lever 67 and disengage the second plunger pin 66a from an aperture of the array of fourth position sheave locking pin apertures 47. Because the latch lever 33b may be biased towards the engaged position, it may automatically reengage the hemispherical stop 33a when the latch release handle or first actuator 20 is pulled.

Figure 12:
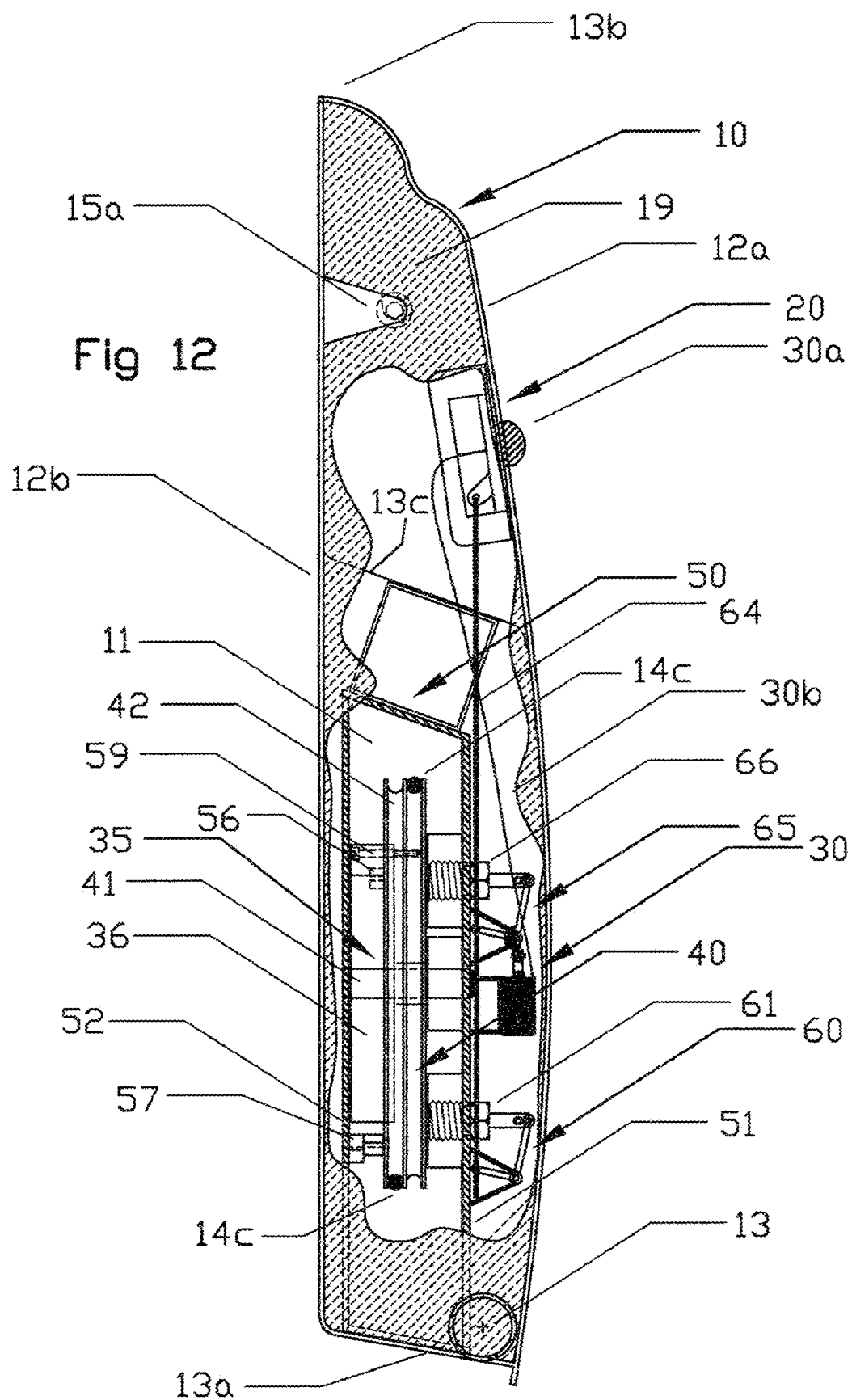
FIG. 12 is a partial, transparent, side view of an alternate embodiment of a multi-position tailgate retaining and counterbalancing apparatus using a electric button and a solenoid connected by wires to release the plunger pin restraint mechanism.
Figure 15:
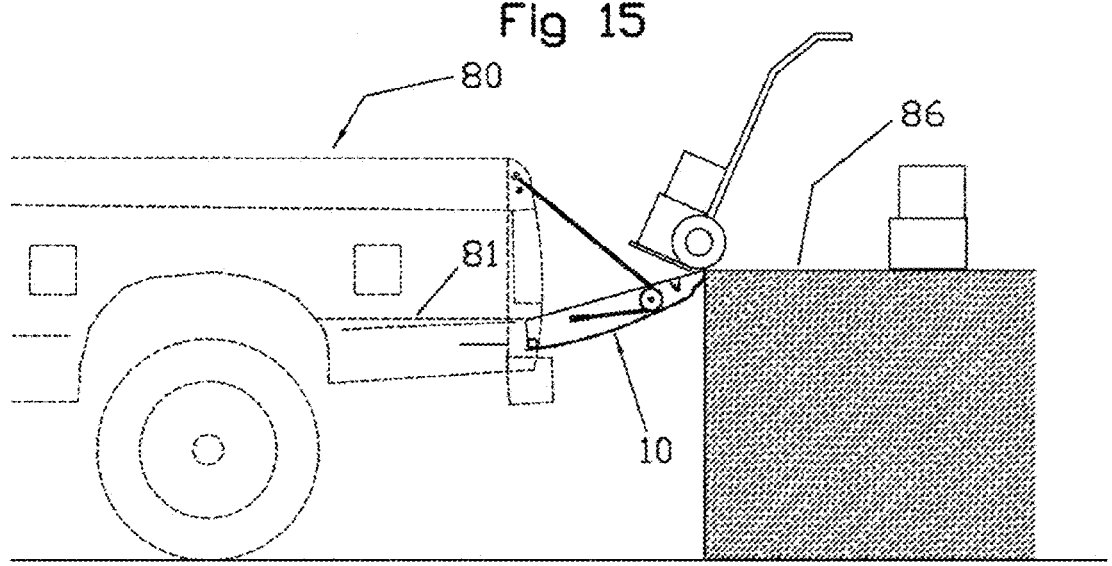
FIG. 15 is a schematic side elevation view illustrating the benefit of raising the height of the leading or top edge of the tailgate when loading from a surface that is higher than the bed of the pickup truck.
Figure 16:
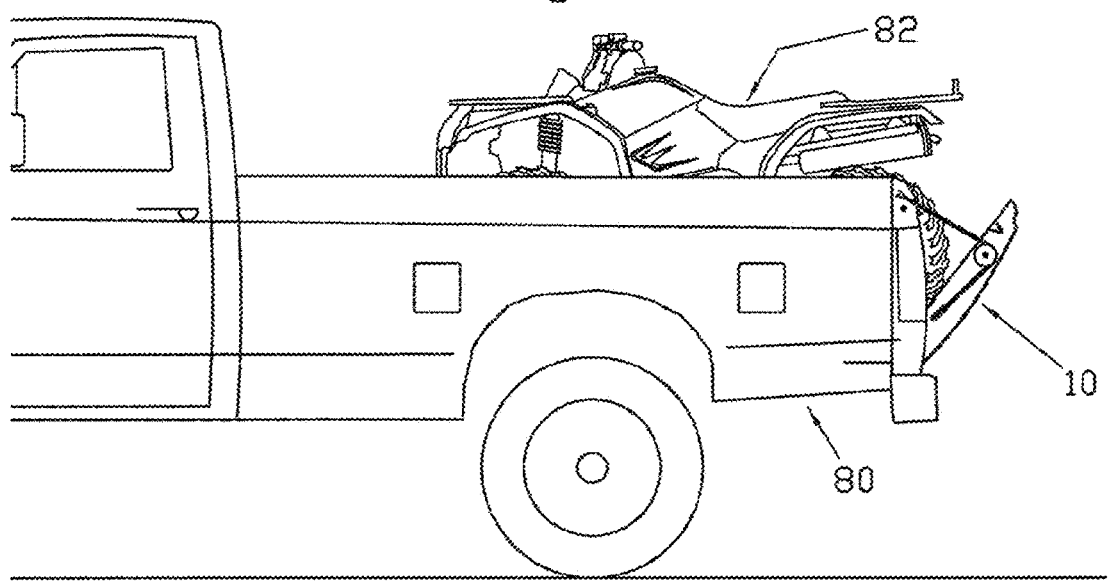
FIG. 16 is a schematic side elevation view illustrating the benefit of raising the height of the leading or top edge of the tailgate in order to accommodate larger cargo or secure cargo against moving rearward.

Referring to FIG. 12, any suitable actuation devices may be used to effect the locking, unlocking, and the like described hereinabove. While the embodiments described hereinabove have focused on mechanical actuation devices, other technologies may be used in the place of mechanical actuation devices. For example, in selected embodiments, electronic actuations devices may be incorporated into systems in accordance with the present invention. In one embodiment, a twelve volt solenoid and corresponding electric button may form an alternative second actuator 30.

Referring to FIG. 13, by allowing a tailgate 10 to open more than 90 degrees, embodiments in accordance with the present invention lower the leading or top edge 13b of the tailgate 10. This may result in a decrease in the steepness of loading ramps 83 commonly used when loading items such as motorcycles, ATV's 82, or small tractors into a pickup truck type motor vehicle bed 80. Decreasing the steepness of the loading ramp angle 84 makes it easier and safer to load and unload such vehicles.

Referring to FIGS. 14-17, a tailgate 10 with a lower leading edge 13b, may also allow or facilitate loading of vehicles with low ground clearance (e.g., riding lawn mowers 85). Such vehicles would normally hang on the leading edge 13b of a conventional tailgate 10 where the loading ramps 83 rest. However, in embodiments in accordance with the present invention, when the leading edge 13b of the tailgate 10 is lowered below the same plane as the bed floor 81, not only is the steepness of the loading ramps 83 reduced, but also the break over angle 87 is greatly reduced. The break over angle 87 may be defined as the angle between the plane of the tailgate 10 extended rearward and the loading ramp(s) 83. The angle that the tailgate 10 rotates down through from the third, conventional open position to the second, fully open position is the tailgate decline angle 88.

Additionally, embodiments in accordance with the present invention allow the height of the leading edge 13b of the tailgate 10 to be easily adjusted to facilitate moving cargo between the pickup bed 81 and loading docks of various heights. They may also facilitate securement of cargo (e.g., ATVs 82) that is longer than the vehicle bed 80.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for positioning a tailgate of a vehicle, the method comprising:
   selecting a vehicle comprising a tailgate connected to pivot through a range of motion bounded at one end by a first, closed position and at the other end by a second, open position, the second position being located more than ninety degrees of rotation from the first position;
   executing a first actuation to release the tailgate from the first position;
   pivoting, during the first actuation, the tailgate out of the first position;
   terminating the first actuation;
   moving, after the terminating and before another actuation, the tailgate through the range of motion from proximate the first position toward the second position;
   locking automatically, during the moving and upon reaching a third position, the tailgate against further movement toward the second position, the third position being contained within the range of motion and located about ninety degrees of rotation from the first position;
   executing a second actuation to release the locking; and
   lowering, after the second actuation, the tailgate to the second position.

2. The method of claim 1, wherein the selecting comprises selecting the vehicle having the tailgate comprising an exterior and a first actuator located on the exterior.

3. The method of claim 2, wherein:
   the first actuation comprises pulling the first actuator; and
   the second actuation comprises pulling the first actuator.

4. The method of claim 3, wherein terminating the first actuation comprises releasing the first actuator.

5. The method of claim 4, wherein moving further comprises moving the tailgate while the first actuator is released.

6. A method for positioning a tailgate of a vehicle, the method comprising:
   selecting a vehicle comprising a tailgate connected to pivot through a range of motion bounded at one end by a first, closed position and at the other end by a second, open position, the second position being located more than ninety degrees of rotation from the first position, the tailgate comprising a sheave assembly, a first sheave lock, an exterior, and a first actuator located on the exterior;
   executing a first actuation comprising actuation of the first actuator to release a latch holding the tailgate in the first position;
   pivoting, during the first actuation, the tailgate out of the first position;
   terminating, after the pivoting, the first actuation;
   moving, after the terminating and before another actuation, the tailgate through the range of motion from proximate the first position toward the second position;
   locking automatically, during the moving and upon reaching a third position, the tailgate against further movement toward the second position, the third position being contained within the range of motion and located about ninety degrees of rotation from the first position, the locking comprising the first sheave lock engaging the sheave assembly to resist rotation of the sheave assembly;
   executing a second actuation comprising actuation of the first actuator to release the first sheave lock; and
   lowering, after the second actuation, the tailgate to the second position.

7. The method of claim 6, wherein the selecting comprises selecting the vehicle having the tailgate further comprising:
   at least one flexible cord, a first portion of the at least one flexible cord extending from the sheave assembly to engage the rest of the vehicle at a location proximate a first side thereof, a second portion of the at least one flexible cord extending from the sheave assembly to engage the rest of the vehicle at a location proximate a second side, opposite the first side;
   a second sheave lock; and
   a second actuator.

8. The method of claim 7, further comprising executing, while the tailgate is between the first and second positions, a third actuation comprising actuation of the second actuator.

9. The method of claim 8, further comprising securing, in response to the third actuation and upon reaching a fourth position, the tailgate against further movement toward the second position, the fourth position being contained within the range of motion, the securing comprising the second sheave lock engaging the sheave assembly to resist rotation of the sheave assembly.

10. The method of claim 9, further comprising executing a fourth actuation comprising actuation of the first actuator to release the second sheave lock.

11. The method of claim 10, wherein the selecting comprises selecting the vehicle having:
   the sheave assembly comprising a sheave having a center, a first plurality of apertures, and a second plurality of apertures, each aperture of the first plurality apertures being spaced a first radial distance from the center, each aperture of the second plurality of apertures being spaced a second radial distance from the center;
   the first sheave lock comprising a first pin positioned to engage the first plurality of apertures; and
   the second sheave lock comprising a second pin positioned to engage the second plurality of apertures.

12. A method for positioning a tailgate of a vehicle, the method comprising:
   selecting a vehicle comprising a first side, second side, and tailgate, the tailgate having an interior cavity and being connected to pivot with respect to the rest of the vehicle through a range of motion bounded at one end by a first, closed position and at the other end by a second, open position, the second position being located more than ninety degrees of rotation from the first position, the tailgate comprising:
      a latch selectively holding the tailgate in the first position,
      an actuator connected to operate the latch,
      a counterbalance comprising an energy storage device, sheave assembly, sheave lock, and at least one flexible cord, and the counterbalance assembly wherein the energy storage device, sheave assembly, and sheave lock are located within the interior cavity, a first portion of the at least one flexible cord extends from the sheave assembly to engage the rest of the vehicle at a location proximate the first side, and a second portion of the at least one flexible cord extends from the sheave assembly to engage the rest of the vehicle at a location proximate the second side;

pulling the actuator to release the latch;

pivoting, during the pulling, the tailgate out of the first position;

releasing, after the pivoting, the actuator;

moving, while the actuator is released, the tailgate through the range of motion from proximate the first position toward the second position;

locking automatically, by the sheave lock during the moving, the sheave assembly against rotation thereof;

holding, by the counterbalance assembly in response to the locking, the tailgate in a third position contained within the range of motion, the third position being about ninety degrees of rotation from the first position;

deactivating the sheave lock by pulling the actuator; and lowering, after the deactivating, the tailgate to the second position.

13. The method of claim 12, further comprising unwinding, during the moving and lowering, the first and second portions of the at least one flexible cord from the sheave assembly.

14. The method of claim 13, further comprising loading, by the sheave assembly during the unwinding, the energy storage device with energy.

15. The method of claim 14, further comprising lifting the tailgate through the range of motion from the second position to the first position.

16. The method of claim 15, further comprising holding, by the latch after the lifting, the tailgate in the first position.

17. The method of claim 16, further comprising winding, during the lifting, the first and second portions of the at least one flexible cord around the sheave assembly.

18. The method of claim 17, further comprising assisting, by the energy storage device, the lifting.

19. The method of claim 18, wherein assisting comprises unloading energy from the energy storage device.

20. The method of claim 19, wherein assisting further comprises urging, by the energy storage device, the winding.

* * * * *